US009446532B2

(12) United States Patent
Nasrallah

(10) Patent No.: US 9,446,532 B2
(45) Date of Patent: Sep. 20, 2016

(54) MAGNETIC KNIFE WEDGE ATTACHMENT

(71) Applicant: Jeffrey W. Nasrallah, Honolulu, HI (US)

(72) Inventor: Jeffrey W. Nasrallah, Honolulu, HI (US)

(73) Assignee: Prodius LLC, Honolulu, HI (US)

( * ) Notice: Subject to any disclaimer, the term of this patent is extended or adjusted under 35 U.S.C. 154(b) by 79 days.

(21) Appl. No.: 14/447,975

(22) Filed: Jul. 31, 2014

(65) Prior Publication Data

US 2016/0031112 A1 Feb. 4, 2016

(51) Int. Cl.

| | |
|---|---|
| ***A22B 5/16*** | (2006.01) |
| ***B26B 11/00*** | (2006.01) |
| ***B25F 3/00*** | (2006.01) |
| ***B26B 3/00*** | (2006.01) |
| ***B26D 7/18*** | (2006.01) |

(52) U.S. Cl.
CPC *B26D 7/18* (2013.01); *B26B 11/00* (2013.01)

(58) Field of Classification Search
CPC .................................. B26D 7/18; B26B 11/00
USPC ...... 30/123, 123.6, 312, 151, 136, 169, 233, 30/153, 295, 128
See application file for complete search history.

(56) References Cited

U.S. PATENT DOCUMENTS

D255,974 S * 7/1980 Jacoby .............................. 30/295
5,682,653 A * 11/1997 Berglof ...................... G09F 1/10 224/183
6,381,855 B1 * 5/2002 Lin ......................... B26B 29/02 30/286
6,457,239 B1 * 10/2002 McLaughlin ......... B26B 29/025 30/151
6,493,946 B1 * 12/2002 Carrillo .................... B26B 29/02 30/295
7,086,156 B2 * 8/2006 McLaughlin ......... B26B 29/025 211/DIG. 1
D539,086 S * 3/2007 Aston, III ................... D7/401.2
8,082,669 B2 * 12/2011 Hayes ........................ B26B 3/00 30/296.1
8,276,768 B1 * 10/2012 Johnson ................. A47G 21/14 206/350
8,584,365 B2 * 11/2013 Zeitlin .................... B26B 11/00 30/123
2004/0010923 A1 * 1/2004 Guiver .................... B26B 29/06 30/233
2006/0053630 A1 * 3/2006 White ..................... B27B 21/04 30/151
2008/0201863 A1 * 8/2008 Yang ....................... B26B 11/00 7/158
2010/0307008 A1 12/2010 Zeitlin
2012/0222312 A1 * 9/2012 Bordas .................... A47J 17/02 30/123.6

FOREIGN PATENT DOCUMENTS

JP 2002-000970 8/2002

* cited by examiner

*Primary Examiner* — Ghassem Alie
*Assistant Examiner* — Bharat C Patel
(74) *Attorney, Agent, or Firm* — Leighton K. Chong

(57) ABSTRACT

A magnetic knife wedge attachment for use with a knife has a spine-mounting portion carrying a permanent magnet adapted to be placed in magnetic contact on the spine of the knife blade, and a blade-mounting portion carrying another permanent magnet forming an L-shaped cross-section with the spine-mounting portion and adapted for magnetic attachment to the side surface of the knife blade. The blade-mounting portion has beveled surfaces tapering to sharp edges so as to form a wedge shape around the edges of the blade-mounting portion for forcing cut food material to tilt outward to prevent adhesion of the cut material to the knife blade. By its magnetic attachment onto two contiguous portions of the metal knife blade, the wedge device provides magnetic strength and holding forces to remain locked onto the knife blade during use for cutting food material.

10 Claims, 6 Drawing Sheets

MAGNETIC KNIFE WEDGE ATTACHMENT

FIELD OF INVENTION

The subject matter disclosed herein generally relates to a knife accessory used to prevent cut material from adhering to a knife blade. In particular, it is directed to a magnetic knife wedge attachment that can be readily positioned on a knife for deflecting cut material from adhering to the blade while cutting.

BACKGROUND ART

Knives are commonly used for cutting in food preparation and may be of a variety of types, such as chef's knife, cook's knife, butcher's knife, kitchen knife, bread knife, paring knife, carving knife, and the like. A chef's knife is an all-purpose knife used in the kitchen for cutting any type of food and some knife designs have some degree of curve to allow the cook to rock the knife on the cutting board for a more precise cut. The broad and heavy blade of the chef's knife also serves for chopping bone instead of the cleaver making it an all-purpose knife for food preparation. Chef's knives are most commonly available between 6 and 12 inches, although 8 inches is the most common size.

A common problem experienced when cutting food with a knife is that debris from the food being cut sticks to the side surfaces of the knife blade. Recipes typically require food to be cut to a particular size and dimension, therefore if food debris remains stuck to the sides of the knife blade during cutting or chopping, it needs to be removed so that the user can continue to accurately achieve the desired cut dimensions. When cutting, chopping, slicing or mincing food, it is also a commonly experienced problem that debris from the cut food adheres to the blade and slows the food preparation process because the food preparer must manually remove the food debris from each side of the blade. Manually pushing off the cut food debris from the blade is typically done by carefully sliding a finger across the blade side to knock off the food pieces adhering to the blade, then perform the same action on the opposite blade side. This procedure must be done slowly and cautiously as it can be dangerous for the food preparer.

Knife designers and manufacturers have understood the need for knife designs that can reduce or prevent cut food adhesion to the side surface areas of a knife blade. Knife manufacturers have incorporated surface features into a knife blade with the intent of making it easier for cut food to release from the blade and to prevent food adhesion. Knife blade designs intended to reduce food adhesion to the blade all revolve around the same principal of reducing surface tension between the blade and the cut food and or attempting to push the cut food away from the blade. Three common blade design features that are used for reducing cut food adhesion include: (1) small smooth indentations ground into the blade surface; (2) blade holes that are complete holes through the blade; and (3) protruding ridges that span nearly the entire length of the blade to reduce adhesion of cut food from the blade.

Some devices have been described in the prior art to address the need to safely remove cut food material from adhering to a knife blade. U.S. Published Application US 2010/0307008 A1 to Eric S. Zeitlin teaches a knife accessory that is an attachable knife wiper that is used by sliding the device lengthwise along the blade of a knife to remove food remnants stuck to the knife blade. The Zeitlin device, however, will get in the way of slicing and chopping of food when cutting or slicing at angles, because the device employs a bulky design that attaches itself to the knife blade by pinching the blade. This device is also potentially dangerous to the user as its oversized shape can interfere with the users line of sight when cutting, preventing the user from clearly seeing their hand placement in relation to the food being cut. It has been found that making a connection to the knife blade by creating a pinching effect causes binding and makes it difficult to slide the device along the knife blade to remove food. Furthermore, this design alters the normal operation of a knife, changing how the knife lays when it is set down and potentially alters how the users grips the knife.

U.S. Pat. No. 8,584,365 to Eric S. Zeitlin teaches a knife accessory that attaches magnetically to a knife and is used by sliding the device to remove food remnants stuck to the knife blade. This device, however, will get in the way of slicing and chopping of food because it extends beneath the knife blade cutting edge. When attached to a knife, this device does not allow for normal cutting as the entire length of the cutting edge of the knife can no longer make continuous contact with the cutting surface or material being cut due to the device extending below the knife's cutting edge. A secondary problem caused by attaching the device to the cutting edge of the knife blade is that an extra strong magnetic force is required to hold the device in place so that the device does not unintentionally fall off from the bottom edge during chopping when strong forces are exerted. The use of extra strong magnets will hinder the ability to slide the device along the knife blade to remove food, and excessive force may be required for the sliding movement that can become both dangerous and troublesome for users. Another danger that the device presents to the user is that its oversized shape can interfere with the user's line of sight when cutting, preventing the user from clearly seeing their hand placement in relation to the food being cut. Furthermore, this design alters the normal operation of a knife, changing how the knife lays when it is set down and potentially alters how the user grips the knife.

Some devices have been described in the prior art to address the need for a knife attachment that can reduce or prevent cut food adhesion to the side surface area of a knife blade. Japanese Patent Publication 2002-000970 to Uchida Isao published on Aug. 1, 2002 teaches a knife accessory that magnetically attaches onto a single side surface of the knife blade to prevent cut food from adhering to the knife blade. A fundamental problem of magnetic attachment to the side surface area of a knife blade is that the side surface area of a knife blade is the weakest point for magnetic attachment and magnetic attraction does not directionally oppose the force exerted during the cutting process. When cutting with a knife the primary directional force that will be exerted, such as on the Uchida device, will be vertically straight up from the cutting edge of the blade toward the knife spine. The strong upward force created during cutting will push the device upward toward the knife spine where it can unintentionally detach from the knife.

Despite these prior efforts to resolve the problem of preventing cut material from adhering to a knife blade, the problem still persists and there is a need for a more convenient and effective solution for deflecting cut material from adhering to the blade while cutting.

SUMMARY OF INVENTION

In a preferred embodiment, a magnetic knife wedge attachment, for use with a knife of the type having a handle, a blade made of metal that is mounted to a mounting end of the handle and having a given blade height at a maximum proximate a hilt at the mounting end of the handle between an upper knife blade spine and a lower knife blade edge, opposite side surfaces tapering edgewise respectively from the upper blade spine to the lower blade edge, and a blade length that extends along the knife blade spine in a longitudinal direction of the blade from the hilt to a knifepoint on a distal end thereof, comprises:

a unitary wedge attachment body having a spine-mounting portion with a linear length adapted to be placed in abutting contact on an intermediate portion of the spine of a knife extending in the longitudinal direction of the knife blade, and a blade-mounting portion coupled to the spine-mounting portion along an upper longitudinal edge thereof forming an L-shaped cross-section with the spine-mounting portion, said blade-mounting portion having a lower longitudinal edge spaced in a direction perpendicular to the longitudinal direction from the upper longitudinal edge, lateral edges spaced in the longitudinal direction opposite from each other, a front surface facing outwardly from the knife blade and a flat back surface facing inwardly for flat abutting contact with a side surface of the knife blade, wherein said lower longitudinal edge of the blade-mounting portion has a beveled surface tapering to a sharp edge so as to form a wedge shape around the edge of the front surface of the blade-mounting portion, at least one permanent magnet mounted in an inner cavity of said blade-mounting portion adapted for magnetic attachment of the back surface of the blade-mounting portion to the side surface of the knife blade, and at least one other permanent magnet mounted in an inner cavity of said spine-mounting portion adapted for magnetic attachment of the spine-mounting portion to the spine of the knife blade.

In a preferred embodiment, the blade-mounting portion has three permanent magnets of disc-shape that are retained in circular cavities formed in the back surface of the blade-mounting portion by threaded screws. The spine-mounting portion has the other permanent magnet in a bar shape retained in a bar-shaped cavity which extends a substantial portion of the linear length of the spine-mounting portion.

The magnetic knife wedge attachment can magnetically attach onto two contiguous portions of the metal knife blade, i.e., to the side surface of the knife blade and to the knife blade spine. The magnetic attachment of the wedge device onto two contiguous portions of the metal knife blade provides the magnetic strength and holding forces to remain stationary and magnetically locked onto the knife blade during use to withstand the forces exerted on the food material during the cutting process. The spine-mounting portion has a thin profile that does not protrude beyond the knife spine so as not to interfere with the user's sightlines to the opposite side surface of the knife blade from the side surface on which the wedge device is mounted. The blade-mounting portion has a height in the direction perpendicular to the knife's longitudinal axis that does not protrude below the lower blade edge when the wedge device is mounted at an intermediate portion of the knife blade spine. The wedge device creates a wedge in between the side surface of the knife blade and the food material being cut for forcing the cut material to tilt outward and away from the knife blade and prevent adhesion of the cut material to the knife blade.

In a preferred embodiment, the height of the blade-mounting portion in the direction perpendicular to the longitudinal direction of the knife blade is a minimum of 1.5 inches and a maximum that does not exceed the height of the knife blade. The thickness of the blade-mounting portion at the thickest part of the wedge shape is a minimum of 2 mm and a maximum that does not exceed the overall girth of the knife.

In an alternative embodiment, the permanent magnets of disc-shape are retained in the blade-mounting portion by plastic covers formed by thermoplastic staking instead of by screws. Thermoplastic staking, also known as heat staking, is a commonly used process for attaching two pieces of plastic together or attaching metal to plastic. Upon heating the plastic piece softens and fuses to the outer surfaces of the cavities in the wedge device, thus mechanically locking the disc-shaped permanent magnets in place. The advantage of heat staking is that the finished back surface of the blade-mounting portion is smooth so that no food material can get stuck within the outer surfaces of the cavities and is easy to keep clean.

Other objects, features, and advantages of the present invention will be explained in the following detailed description of a preferred embodiment with reference to the appended drawings.

DETAILED DESCRIPTION OF PREFERRED EMBODIMENT

In the following detailed description of the subject matter hereof, a preferred embodiment is illustrated with certain specific details of implementation. However, it will be recognized by one skilled in the art that many other variations and modifications may be made and/or practiced in analogous applications or environments. It should be noted that methods, procedures, components, or functions that are commonly known to persons of ordinary skill in the field of the invention are not described in detail herein so as avoid unnecessarily obscuring a concise description of the preferred embodiment.

Figure 1A:
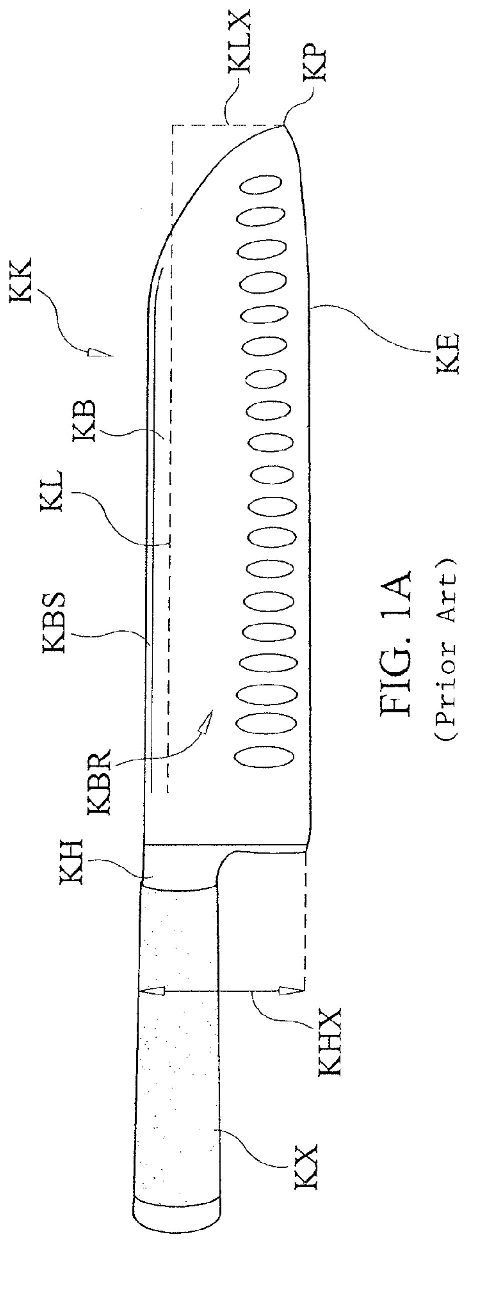
FIG. 1A (Prior Art)
FIGS. 1A and 1B show side and top views, respectively, of a standard type of knife known as a chef's knife.
Figure 1B:
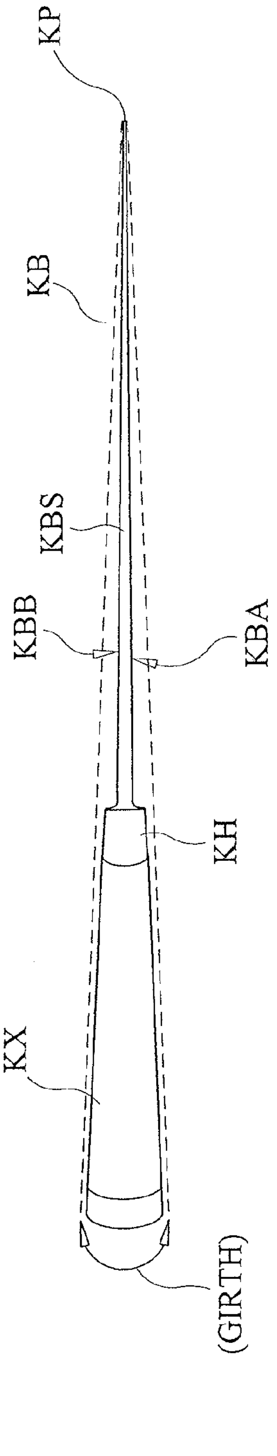
FIG. 1B (Prior Art)

The magnetic knife blade wiper as described herein is intended for use with any standard type of knife of various sizes and shapes. In generality, as shown in FIGS. 1A and 1B, which are side and top views, respectively, a standard type of knife KK known as a chefs knife has a handle KX, a hilt KH defining a transition or coupling to a blade, a blade KB made of metal that is mounted to the handle KX by the coupling of the hilt KH. The blade has a spine KBS that is generally linear in alignment with a horizontal axis KL of the blade, a cutting edge KE, and tapers at its distal end to a knife point KP. The blade has a length KLX from hilt KH to knife point KP, and a height KHX generally defined as a maximum height of the blade at a position proximate the hilt KH of the knife. The term "girth" of the knife is generally defined by the outer boundaries (dashed lines, GIRTH) of the knife's thickness when the knife is lying on its side on a flat surface. The blade KB has generally flat, opposite side surfaces KBA, KBB (in FIG. 1B) tapering edgewise respectively from the upper spine KBS to the lower blade edge KE. The knife blade KB may have a row of scalloped recesses or dips KBR in parallel with and proximate the knife blade edge KE for reducing adhesion of cut food to the side surfaces KBA, KBB of the knife blade.

Figure 2A:
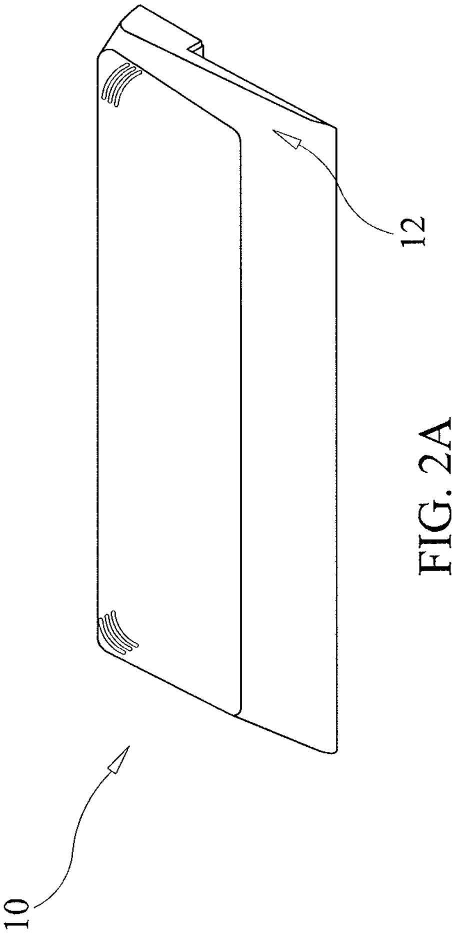
FIGS. 2A and 2B show front and rear perspective views, respectively, of a preferred embodiment of a magnetic knife wedge attachment.
Figure 2B:
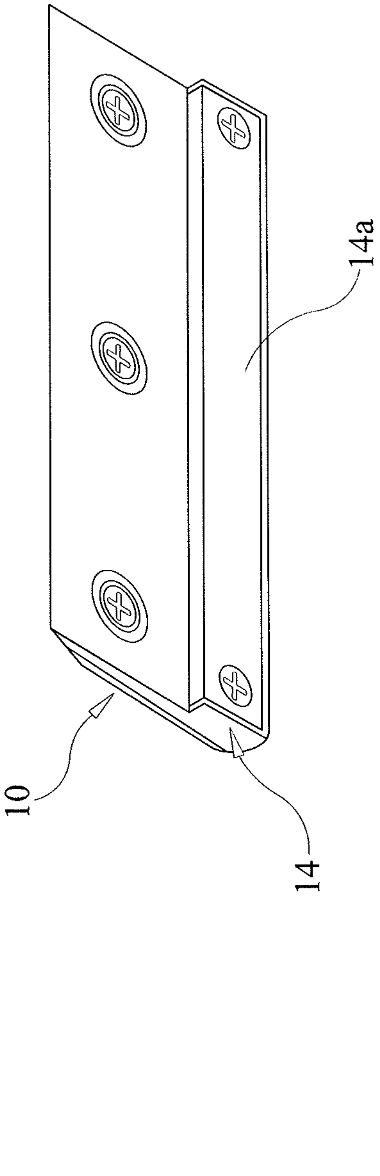
Figure 3A:
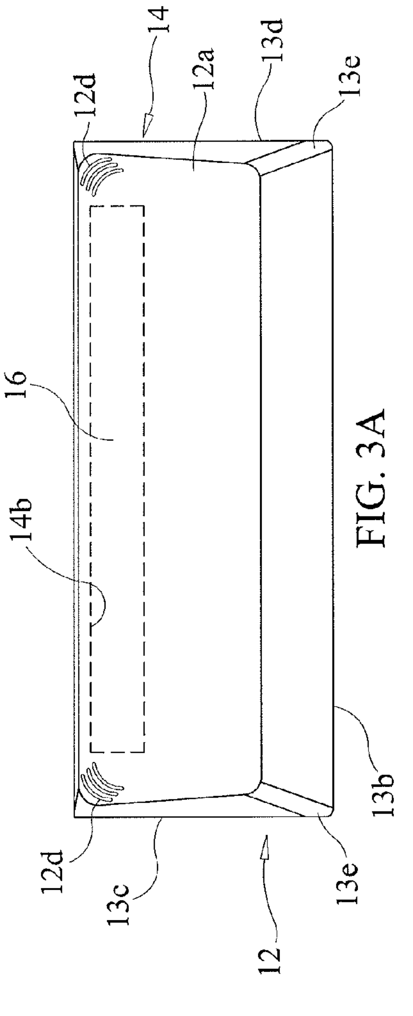
FIGS. 3A, 3B, and 3C show front elevation, back elevation, and side elevation views, respectively, of the preferred embodiment of a magnetic knife wedge attachment.
Figure 3B:
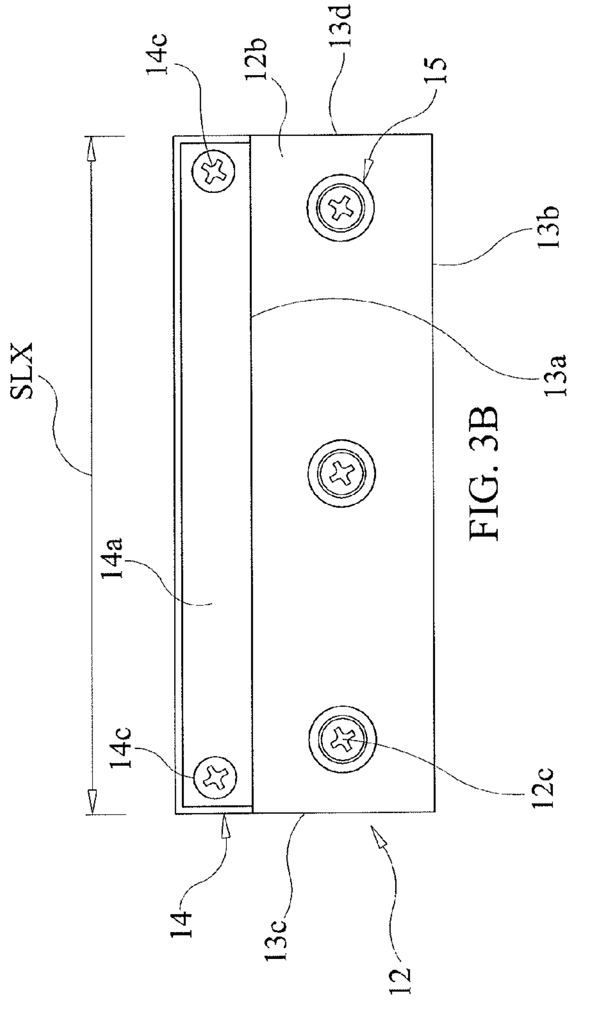
Figure 3C:
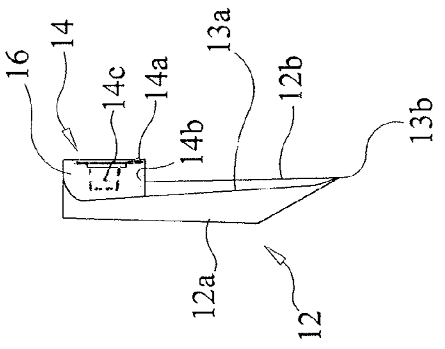

FIGS. 2A and 2B show front and rear perspective views, respectively, of a preferred embodiment of a magnetic knife wedge attachment 10. FIGS. 3A, 3B, and 3C show front elevation, back elevation, and side elevation views, respectively, of the preferred embodiment of the magnetic knife wedge attachment 10. The magnetic knife wedge attachment 10 is formed as a unitary wedge attachment body made of plastic material having a blade-mounting portion 12 and a spine-mounting portion 14 having a generally elongated shape extending in a longitudinal direction. The blade-mounting portion 12 has a front surface 12*a* and a back surface 12*b*. It is coupled to the spine-mounting portion 14 along an upper longitudinal edge 13*a* forming an L-shaped cross-section with the spine-mounting portion 14. The blade-mounting portion 12 has a lower longitudinal edge 13*b* spaced in a direction perpendicular to the longitudinal direction from the upper longitudinal edge 13*a*, and lateral edges 13*c*, 13*d* spaced in the longitudinal direction opposite from each other. The lower longitudinal edge 13*b* and lateral edges 13*c*, 13*d* of the blade-mounting portion 12 have beveled surfaces tapering to sharp edges so as to form a wedge shape around the edges of the front and back surfaces 12*a* of the blade-mounting portion 12. Rounded corners 13*e* provide smooth curved transitions between lower longitudinal edge 13*b* and lateral edges 13*c*, 13*d*. Friction lines at the upper corners 12*d* of the wedge attachment body 10 provide the user with gripping surfaces for installing and removing the device on and from a knife. The spine-mounting portion 14 (and the wedge device overall) has a linear length SLX and is adapted to be placed in abutting contact on an intermediate portion of the spine of a knife extending in the longitudinal direction of the knife blade.

The blade-mounting portion has at least one (three in the preferred embodiment) permanent magnets 15 of disc-shape that are retained in circular cavities formed in the back surface 12*b* of the blade-mounting portion 12 by threaded screws 12*c*.

The spine-mounting portion 14 has a metal plate cover 14*a* for retaining the other permanent magnet 16 in a bar shape in a bar-shaped cavity 14*b* which extends a substantial portion of the linear length SLX of the spine-mounting portion. Screws 14*c* in threaded screw holes are provided at each end of the metal plate cover 14*a* to hold the metal plate cover onto the plastic body of the wedge attachment 10.

Figure 4:
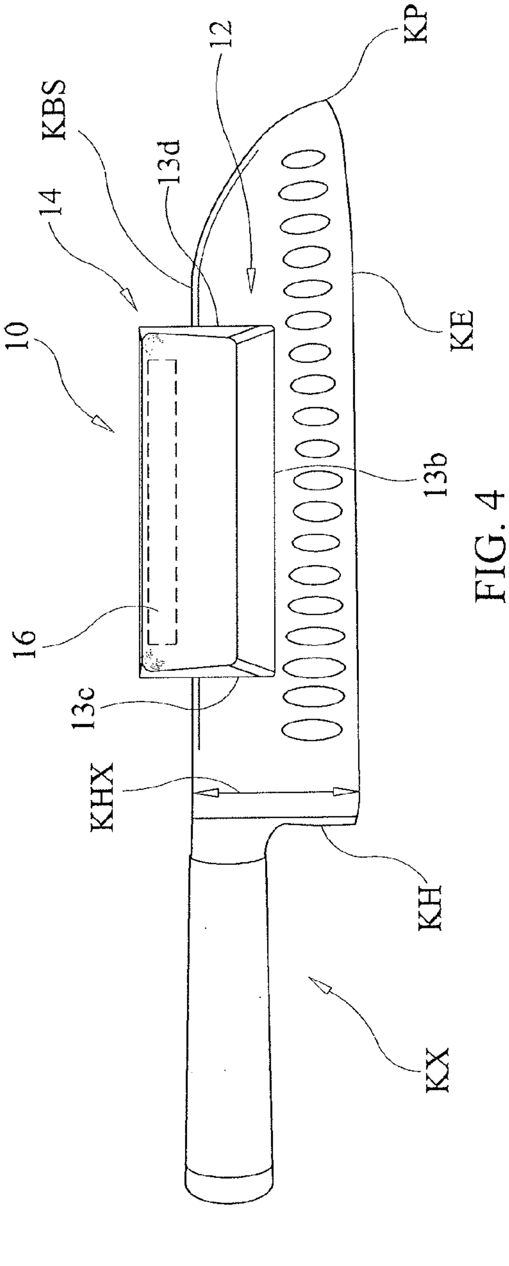
FIG. 4 is a side view showing the magnetic knife wedge attachment in use on a knife.

FIG. 4 is a side view showing the magnetic knife wedge attachment 10 in use on a knife. The spine-mounting portion 14 is placed in abutting contact on an intermediate portion of the spine KBS of the knife. The blade-mounting portion 12 has its front surface facing outwardly from the knife blade and its back surface facing inwardly for flat abutting contact with a side surface of the knife blade.

The magnetic knife wedge attachment can magnetically attach onto two contiguous portions of the metal knife blade, i.e., to the side surface of the knife blade and to the knife blade spine. The magnetic attachment of the wedge device onto two contiguous portions of the metal knife blade provides the magnetic strength and holding forces to remain stationary and magnetically locked onto the knife blade during use to withstand the forces exerted on the food material during the cutting process. The spine-mounting portion has a thin profile that does not protrude beyond the knife spine so as not to interfere with the user's sightlines to the opposite side surface of the knife blade from the side surface on which the wedge device is mounted. Furthermore, the wedge attachment is configured so as not to protrude beyond the girth of the knife defined by the widest width of the knife handle or hilt, so as not to impede the ability to slice smoothly through the food material on the side of the knife blade opposite which the wedge device is mounted. The blade-mounting portion has a height in the direction perpendicular to the knife's longitudinal axis that is less than the blade height KHX so that it does not protrude below the lower blade edge KE when the wedge device is mounted on the knife blade spine KBS.

In the preferred embodiment shown, the height of the blade-mounting portion in the direction perpendicular to the longitudinal direction of the knife blade is a minimum of 1.5 inches (to match the height of a standard type of smaller knife) and a maximum that does not exceed the height of the knife blade. The thickness of the blade-mounting portion at the thickest part of the wedge shape is a minimum of 2 mm and a maximum that does not exceed the overall girth of the knife at its widest point, so as not to interfere with the sightlines of the user during cutting operations. The wedge attachment may be about 4 inches in length to span approximately half the length of one side of the common 8-inch knife blade. The metal plate of the spine-mounting portion may have a 90 degree bend at its bottom side which strengthen the structure of the device and allows the magnet bar to sit directly onto the spine of the knife. The magnetic force of the bar magnet has ample strength to magnetize the metal plate and transfer its magnetic force onto the knife spine.

A strong magnetic connection to the spine of the knife is required so that when cutting hard or tough food that the device does not unintentionally detach from the knife. When cutting with a knife, the primary directional force exerted onto the device is vertically straight up from the cutting edge of the blade toward the knife spine, therefore the ideal location to create the strongest magnetic connection on the knife is on the spine where it will directionally oppose the upward force that is created during the cutting process. A secondary force is exerted onto the device when cutting that is perpendicular to the blade and can cause the back side of the device to move away from the blade side and breaking the magnetic bar connection at the spine, causing the entire device to rotate up and over the knife spine resulting in the bar magnet reattaching to opposite side of the knife just below the spine. This secondary force is created when the food being cut gets wedged in between the device and the blade surface. To prevent this secondary force from causing unintentional detachment of the device, the three disc-shaped magnets on the back side of the blade-mounting portion provide a counter retaining force. Screws are used to hold the disc-shaped magnets onto the back of the device such that the surface of the magnetic disc is flush or slightly protruding from the back surface area of the plastic body to allow for direct contact with the blade surface.

The device is wedge-shaped so that the bottom edge of the plastic body of the device that will first come into contact with food during cutting is the thinnest part of the device, and the thickness gradually increases along the wedge shape. The wedge shape of the device pushes the food piece that is being cut away from the blade, creating an outward force from the blade to eliminate surface tension and adhesion of the cut food to either the blade or the device. When chopping food into small pieces it is common for many small pieces to adhere to the blade and cover a large area of the blades surface. What commonly occurs during chopping of food is that the chopped pieces of food gradually work their way up the blade of the knife as each new piece of food is chopped a new piece adheres to the blade and pushes the previous piece of food that adhered to the blade upward until eventually many pieces of the cut food cover a majority of the surface area of the blade. The wedge shape of the device helps to prevents finely cut pieces of food from migrating up the blade during chopping as the wedge breaks the surface tension and forces the chopped pieces of food away and off from the blade.

The device is installed by simply positioning it over the desired area of the knife blade, then allowing the magnets to make contact with the metal spine of the knife and the blade side. Removal of the device is most easily done by pulling on the top corner of the device closest to the knife handle.

Figure 4B:
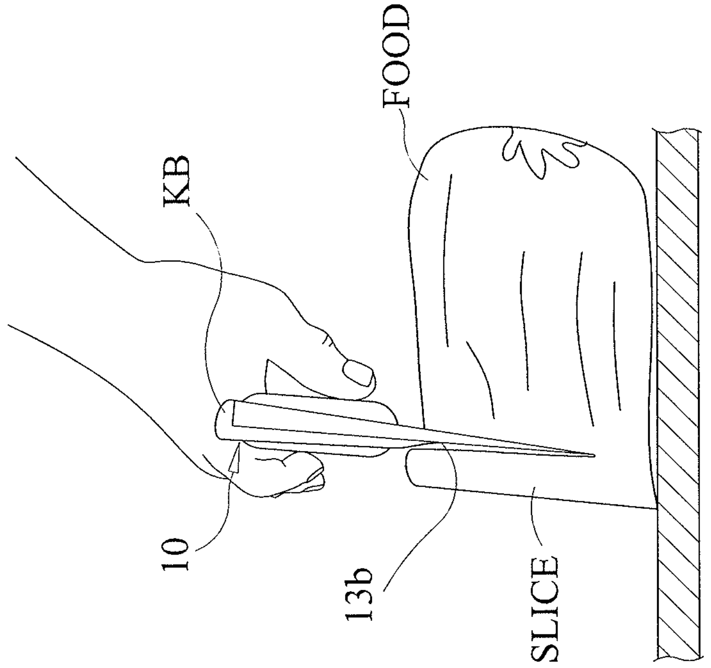
FIGS. 4A, 4B and 4C are a series of views showing use of the magnetic knife wedge attachment to deflect cut food material from adhering to the side surface of the knife.
Figure 4A:
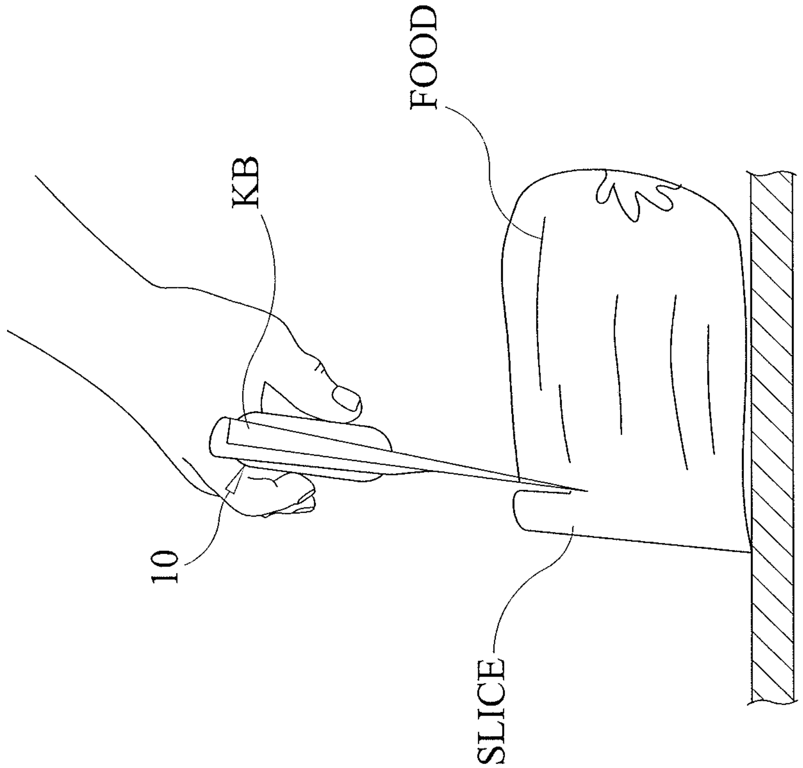
Figure 4C:
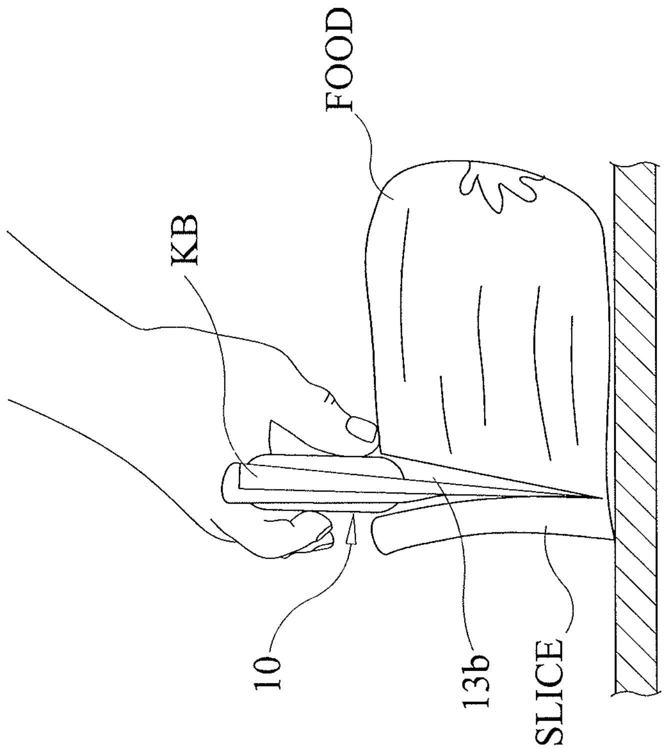

FIGS. 4A, 4B and 4C are a series of views showing use of the magnetic knife wedge attachment 10 to deflect cut material (SLICE) from a FOOD item from adhering to the side surface of the knife. The wedge device 10 creates a wedge leading with the lower longitudinal edge 13*b* in between the side surface of the knife blade and the food material being cut for forcing the cut material to tilt outward and away from the knife blade and prevent adhesion of the cut material to the knife blade.

The wedge attachment of this invention provides a means for preventing food from adhering to the blade of a knife by reducing the surface tension between the blade and the cut food by pushing the cut food away from the blade. The wedge attachment is designed so that it does not cause any interference or impediment with the normal cutting process, and reduces the amount of time typically required for cutting, chopping, slicing or mincing food. The wedge attachment is designed to work with all types of standard metal knives such as: chef's knife, cook's knife, butcher's knife, kitchen knife, bread knife, paring knife, carving knife, and the like. Due to the large variety of cutting knives and the variation of blade thicknesses, the wedge attachment is designed for universal fit with a majority of all metal knives. The wedge attachment is designed to magnetically attach to the spine and one side surface of a knife without the need to adjust for differing blade thicknesses, and can be used on the opposite side surface of the knife without having to adjust it if the operator is right-handed or left-handed. The spine of a knife is opposite the cutting edge and is thicker than the cutting edge that gives the blade weight and strength. The preferred embodiment allows for attachment to any metal knife regardless of blade thickness and regardless of the spine being flat or fully rounded. There are other designs that could be employed to magnetically attach a knife accessory to a blade for the purpose of preventing food adhesion onto the blade, however the preferred embodiment employs a design that can achieve a universal fit with the common kitchen knife. The wedge attachment is designed for quick and easy attachment onto a knife and for quick and easy removal from a knife. It is designed to be dishwasher safe, made of commonly used kitchenware materials, and employ permanent magnets of high magnetic bond strength (such as that of neodymium magnets) to the metal blade of the knife.

The following modifications to the preferred embodiment can be made without changing its functionality, including but not limited to: placing the magnets in different orientation or locations on the device; using different magnet shapes and thicknesses with stronger or weaker magnetic properties; the magnets can be fully encased within the plastic body of the device or covered with different materials; the use of different types of magnets such as ceramic magnets, ferrite magnets or Mn—Al alloy magnets could be used in place of neodymium magnets; instead of using the metal plate to cover the bar magnet, there could be no metal plate which would allow for direct contact between bar magnet and knife spine; the dimensions of the device can be increased or decrease in length, width and or thickness; the surface texture of the device could have any type of texture to reduce surface tension; the shape of the wedge could be increased or decreased in thickness and or modified in shape.

In an alternative embodiment, the permanent magnets of disc-shape are retained in the blade-mounting portion by plastic covers formed by thermoplastic staking instead of by screws. Thermoplastic staking, also known as heat staking, is a commonly used process for attaching two pieces of plastic together or attaching metal to plastic. Upon heating the plastic piece softens and fuses to the outer surfaces of the cavities in the wedge device, thus mechanically locking the disc-shaped permanent magnets in place. The advantage of heat staking is that the finished back surface of the blade-mounting portion is smooth so that no food material can get stuck within the outer surfaces of the cavities and is easy to keep clean.

Many modifications and variations may of course be devised given the above description of preferred embodiments for implementing the principles in the present disclosure. It is intended that all such modifications and variations be considered as within the spirit and scope of this disclosure, as defined in the following claims.

The invention claimed is:

1. A magnetic knife wedge attachment, for use with a knife of the type having a handle, a blade made of metal that is mounted to a mounting end of the handle and having a given blade height at a maximum proximate a hilt at the mounting end of the handle between an upper knife blade spine and a lower knife blade edge, opposite side surfaces tapering edgewise respectively from the upper blade spine to the lower blade edge, and a blade length that extends along the knife blade spine in a longitudinal direction of the blade from the hilt to a knifepoint on a distal end thereof, comprising:

a unitary wedge attachment body having a spine-mounting portion with a linear length adapted to be placed in abutting contact on an intermediate portion of the spine of a knife extending in the longitudinal direction of the knife blade, and a blade-mounting portion coupled to the spine-mounting portion along an upper longitudinal edge thereof forming an L-shaped cross-section with the spine-mounting portion, said blade-mounting portion being mounted flat against one side of the knife blade and having a lower longitudinal edge spaced in a direction perpendicular to the longitudinal direction from the upper longitudinal edge, lateral edges spaced in the longitudinal direction opposite from each other, a front surface facing outwardly from the knife blade and a flat back surface facing inwardly for flat abutting contact with a side surface of the knife blade, wherein said opposite sided lateral edges and said lower longitudinal edge of the blade-mounting portion have continuous beveled surfaces running continuously along the lengths of said edges and each said edges tapering to a sharp edge so as to form a wedge shape around the lateral and lower longitudinal edges of the blade-mounting portion for separating food cuttings from the side of the knife blade, at least one permanent magnet mounted in an inner cavity of said blade-mounting portion adapted for magnetic attachment of the back surface of the blade-mounting portion to the side surface of the knife blade, and at least one other permanent magnet mounted in an inner cavity of said spine-mounting portion adapted for magnetic attachment of the spine-mounting portion to the spine of the knife blade.

2. The magnetic knife wedge attachment according to claim 1, wherein said at least one permanent magnet comprises three permanent magnets.

3. The magnetic knife wedge attachment according to claim 1, wherein the at least one permanent magnet has a disc-shape and is retained in a circular cavity formed in the back surface of the blade-mounting portion by a threaded screw.

4. The magnetic knife wedge attachment according to claim 1, wherein the at least one other permanent magnet in the spine-mounting portion has a bar shape and is retained in a bar-shaped cavity which extends a substantial portion of the linear length of the spine-mounting portion.

5. The magnetic knife wedge attachment according to claim 1, wherein the spine-mounting portion has a thin profile that does not protrude beyond the knife spine so as not to impede smooth slicing of food material, furthermore so as not to interfere with user sightlines to the opposite side surface of the knife blade from the side surface on which the wedge device is mounted.

6. The magnetic knife wedge attachment according to claim 1, wherein the height of the blade-mounting portion in the direction perpendicular to the longitudinal direction of the knife blade is a minimum of 1.0 inches and a maximum that does not exceed the height of the knife blade.

7. The magnetic knife wedge attachment according to claim 5, wherein the thickness of the blade-mounting portion at the thickest part of the wedge shape is a minimum of 2 mm and a maximum that does not exceed a girth of the knife defined by boundaries determined by the knife handle at a widest width of the knife handle.

8. The magnetic knife wedge attachment according to claim 1, wherein the at least one permanent magnet is retained in the blade-mounting portion by a plastic cover formed by thermoplastic staking, so that the back surface of the blade-mounting portion is kept smooth and easy to keep clean.

9. The magnetic knife wedge attachment according to claim 1, wherein rounded corners are provided for smooth curved transitions between the lower longitudinal edge and the lateral edges of the blade-mounting portion.

10. The magnetic knife wedge attachment according to claim 1, wherein friction lines are provided at upper corners of the wedge attachment body to be used as gripping surfaces for installing or removing the wedge attachment body on a knife.

* * * * *